United States Patent [19]
Schlossberg

[11] 3,725,814
[45] Apr. 3, 1973

[54] APPARATUS FOR LOCKING THE FREQUENCY OF A LASER TO AN ATOMIC ABSORPTION LINE

[75] Inventor: Howard Schlossberg, Lexington, Mass.

[73] Assignee: The United States of America as represented by the Secretary of the Air Force

[22] Filed: Sept. 10, 1971

[21] Appl. No.: 179,383

[52] U.S. Cl. ................................................331/94.5
[51] Int. Cl. ..............................................H01s 3/08
[58] Field of Search ......................331/94.6; 350/160

[56] References Cited
UNITED STATES PATENTS

| | | |
|---|---|---|
| 3,609,587 | 9/1971 | Kolb, Jr. et al. ...................331/94.5 |
| 3,471,800 | 10/1969 | Congleton et al. .................331/94.5 |
| 3,443,243 | 5/1969 | Patel ...................................331/94.5 |
| 3,560,789 | 2/1971 | Hernqvist ............................331/94.5 |

*Primary Examiner*—William L. Sikes
*Attorney*—Harry A. Herbert et al.

[57] ABSTRACT

An apparatus made up of a laser and a compound optical resonator which locks the frequency of the laser to the atomic absorption line of a gas having a narrow absorption line and which is placed within the compound resonator. The gas sufficiently destroys the interference effects of the resonator thereby lowering the loss of the resonator to a value for which the laser will oscillate. This oscillation frequency is thus locked to the frequency of the absorption line of the gas.

6 Claims, 1 Drawing Figure

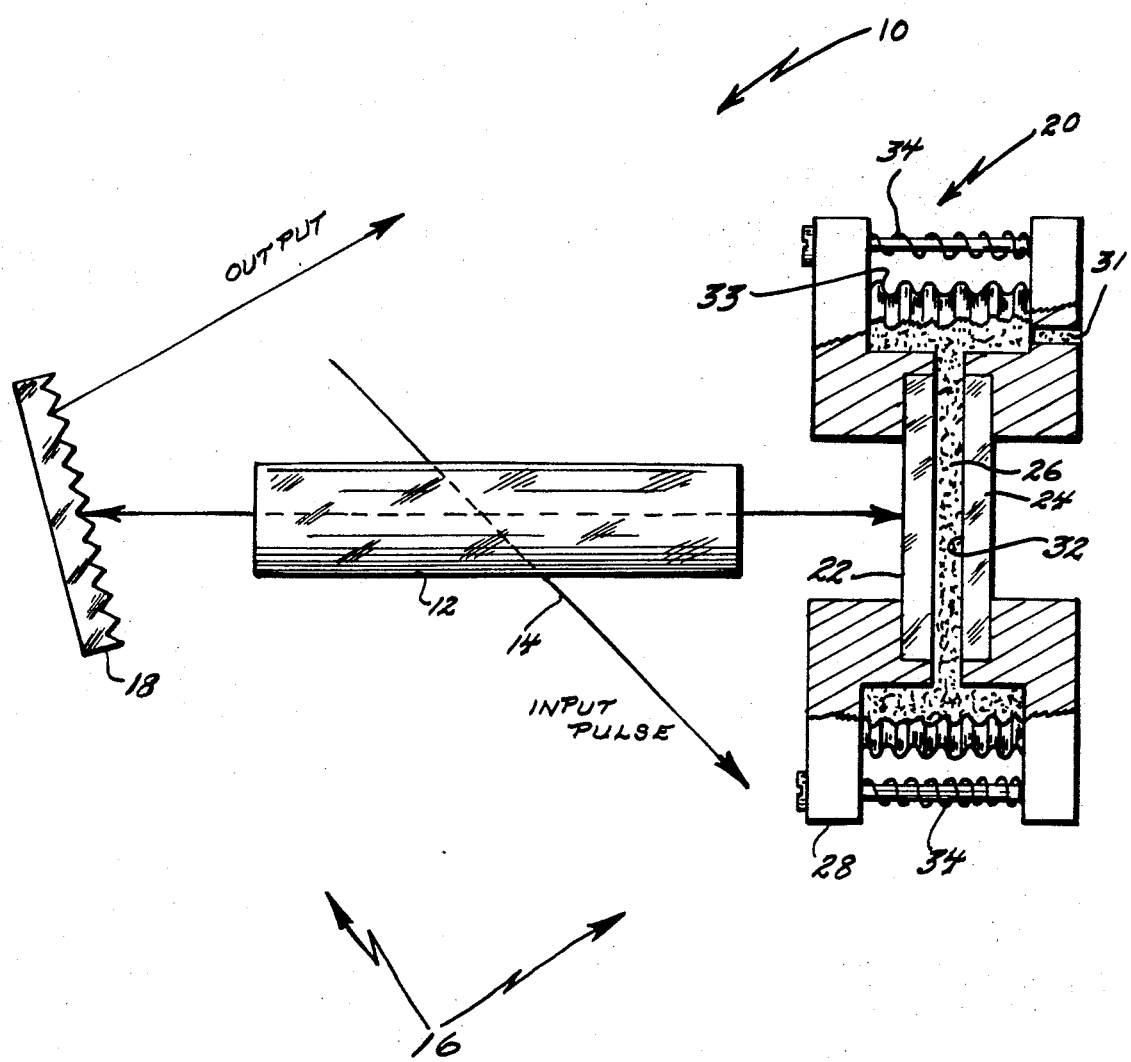

APPARATUS FOR LOCKING THE FREQUENCY OF A LASER TO AN ATOMIC ABSORPTION LINE

SUMMARY OF THE INVENTION

This invention relates generally to lasers, and more particularly to an apparatus which is capable of locking the frequency of a laser to an atomic absorption line of a gas.

Most lasers consist of a column of active material having a partly reflecting mirror at one end and a fully reflecting mirror at the other. In a typical solid laser material a ruby crystal, the active ingredients are chromium atoms interspersed in the crystal lattice of aluminum oxide. The laser is primed by pumping these atoms, by means of a flash of intense light, to an excited state. With a preponderance of atoms in that state the system can be stimulated to produce a cascade of photons, all the same wavelength and all in step, by triggering the emission of energy that drops the atoms from the excited state to a lower energy state. A photon carrying this quantum of energy, on striking an excited atom, causes it to emit a photon at the same frequency, and the light wave thus released falls in step with the triggering one. Waves that travel to the sides of the column leave the system, but those that go to the ends of the column along its axis are reflected back and forth by the mirrors. The column, whose length is a whole number of wavelengths at the selected frequency, acts as a cavity resonator, and a beam of monochromatic, coherent light rapidly builds in intensity as one atom after another is stimulated to emit photons with the same energy and direction. After the laser light has built up in this way it emerges through the partly reflecting mirror at one end of the column as an intense highly directional beam.

It would be a great advantage if the oscillation frequency of the laser or optical oscillator could be locked to the narrow absorption line of a gas. This would allow lasers or oscillators with broad gain widths to be passively frequency stabilized. Such a technique would be especially useful where a normally broad band oscillator such as a dye laser is being used as a source to study or probe atmospheric constituents for pollutants. For example, if the oscillation frequency of such a dye laser were locked to the atomic absorption line of a specific pollutant such as $SO_2$ it would be extremely easy to determine the presence and amount of such a gas within the atmosphere to be tested.

Heretofore, in almost all cases, the use of a laser capable of having its oscillation frequency locked to the narrow absorption line of a specific gas was economically and practically unfeasible. It is possible by the use of a grating to somewhat narrow the bandwidth of a laser; however, such a technique fails to lock the oscillation frequency to the center of the absorption line of a gas.

SUMMARY OF THE INVENTION

The instant invention overcomes the problems set forth hereinabove by providing an apparatus capable of locking the broad bandwidth of a laser to the atomic absorption line of a gas in a practical and economical manner.

This invention utilizes a conventional grating in combination with a Fabry Perot interferometer as the compound optical resonator of a laser or parametric oscillator system. The use of a Fabry Perot inferometer in the instant invention is made possible by the insertion of a gas between the reflecting surfaces of the Fabry Perot inferometer, a concept entirely contrary to the intended use of the Fabry Perot inferometer, i.e. as a filter.

With the apparatus of the instant invention the grating of the optical resonator may be utilized to slightly narrow the bandwidth of the laser to a range which is well within the capability of prior art devices. This initial narrowing of the bandwidth, however, falls well short of the narrow bandwidth required in many of today's laser applications as, for example, in a pollutant detector. Utilizing a Fabry-Perot inferometer with a gas located in the space between the mirrors thereof so as to destroy the resonance of the inferometer, and adjusting the width of the space so as to give the Fabry-Perot inferometer a high transmission over the bandwidth where the instant device would oscillate if a conventional reflector were utilized instead of the Fabry-Perot, permits the use of a Fabry-Perot inferometer as the other reflector of the optical resonator of this invention.

The apparatus of this invention produces a very general system for locking an optical oscillator to a narrow band absorption resonance line in a gas. Its essential feature is the use of interference effects to produce a compound optical resonator having a high loss over the whole of the bandwidth of the gain material. The absorbing gas, at a suitable pressure, is then placed in a position to destroy the interference effects to such an extent as to make the resulting optical cavity have sufficiently high Q to oscillate within the absorber linewidth.

It is therefore an object of this invention to provide an apparatus utilizing a compound optical resonator with an absorbing gas to lock the frequency of a laser or parametric oscillator to the gas absorption frequency.

It is a further object of this invention to provide an apparatus which will allow oscillators with broad gain widths to be passively frequency stabilized.

It is still another object of this invention to provide an apparatus for locking the frequency of a laser to an atomic absorption line which is economical to produce, which utilizes conventional currently available components in its manufacture, and which is highly reliable in operation.

For a better understanding of the present invention together with other and further objects thereof, reference is made to the following description taken in connection with the accompanying drawing and its scope will be pointed out in the appended claims.

DESCRIPTION OF THE DRAWING

The only FIGURE of the drawing is a side elevational view, shown partly in crossection, of the apparatus of this invention capable of locking the frequency of a laser to an atomic absorption line.

DETAILED DESCRIPTION OF THE PREFERRED EMBODIMENT

Reference is now made to the only FIGURE of the drawing, which shows the apparatus 10 which locks the frequency of a laser to the absorption frequency of a gas.

This apparatus 10 is made up of a parametric oscillator or laser 12, a conventional input pulse 14 which may be in the form of a flash of intense light, and a compound optical resonator 16 which allows oscillation of the laser to take place.

An essential feature of the instant invention is that the optical resonator 16 of this invention is made up of a suitable reflecting member such as grating 18 at one end and a uniquely designed Fabry-Perot inferometer 20 at the other. The Fabry-Perot inferometer 20 utilized in this invention differs from the conventional Fabry-Perot inferometer in that contained between suitable reflecting surfaces, such as mirrors 22 and 24 is a gas 26. Due to the relationship between the gas 26 and mirrors 22 and 24 of inferometer 20, it is possible to lock the frequency of the output beam of laser 12 to the atomic absorption line of gas 26 in a manner to be set forth in detail hereinbelow.

Reference is made specifically to the Fabry-Perot inferometer 20. Inferometer 20 is made up of a pair of reflecting surfaces or mirrors 22 and 24 which are held in position by any suitable adjustable clamp 28. The space 32 between mirrors 22 and 24 is capable of being varied by spring biased bolts 34. With the conventional Fabry-Perot inferometer the space 32 between mirrors 22 and 24 is evacuated and any incoming wave is multiply reflected between the two mirrors 22 and 24 until total transmission of the incoming wave takes place. Therefore, under conventional conditions, utilizing the Fabry-Perot inferometer as a component of the optical resonator 16 of a laser, it would be virtually impossible for the laser to oscillate.

With this invention the spacing 32 is adjusted by spring biased bolts 34 so as to give the Fabry-Perot inferometer 20 a high transmission over the bandwidth wherein the apparatus 10 would oscillate if a conventional reflector were used in place of inferometer 20. A gas 26 now enters through inlet 31 and is confined between mirrors 22 and 24 by any suitable container, such as bellows 33, thereby destroying the resonance of the Fabry-Perot inferometer 20. Thus, over some portion of absorption line of gas 26 the laser 12 "sees" only the front mirror 22 of the Fabry-Perot inferometer 20 and can oscillate. This oscillation has therefore been locked to the absorption frequency of the particular gas 26 located between mirrors 22 and 24.

As an example of the operation of apparatus 10 of the instant invention, a dye laser system is utilized operating at approximately 7665A, a strong absorption line of potassium vapor. With proper alignment of grating 18 a conventional optical resonator produces a laser output centered at the 7655A potassium resonance line with a spectrum of approximately 0.5A wide.

In the instant invention a Fabry-Perot inferometer 20 as shown in the FIGURE is substituted for one of the reflecting surfaces of a conventional optical resonator. The mirrors 22 and 24 of inferometer 20 are coated for 64 percent reflectivity at 7665A, resulting in a finesse of 7. It should be noted that these figures are merely used as an illustration, and that the present invention is operable with various other reflectivities and design features. The mirror separation 32 nominally ½ mm is set to give a transmission resonance at normal incidence at 7665A potassium resonance line. The system is maintained at a temperature of approximately 162° C, for which the vapor pressure of potassium is one millitorr. The free spectral range for a ½ mm mirror separation 32 is 10 cm$^{-1}$ so that with finesse of 7 the Fabry Perot 20 reflects less than 50 percent of the light incident on it over a 2.86 ($2 \times 10/7$) cm$^{-1}$ band centered at the transmission maximum. The grating 18 is aligned for 7665A and the input ruby laser is adjusted to require greater than 55 percent reflection at the Fabry Perot end of the optical resonator 16.

With the instant invention any suitable gas 26, such as potassium vapor is pumped through inlet 31 into bellows 33 between mirrors 22 and 24. The absorption coefficient of the vapor at line center is $\alpha = 120/cm$. Thus the single pass absorption in the Fabry Perot ½ mm path length is exp ($-6$) at line center. This is far more than adequate to destroy the Fabry Perot resonance. Therefore, over some portion of the potassium line, the dye laser 12 effectively "sees" only the front 64 percent mirror 22 of the Fabry Perot inferometer 20 and oscillates. This oscillation is locked to the absorption frequency of the potassium vapor or any other gas 26 which may be utilized with this invention.

Although this invention has been described with reference to a particular embodiment it will be understood to those skilled in the art that this invention is also capable of a variety of alternate embodiments utilizing a wide variety of gases all within the spirit and scope of the appended claims.

I claim:

1. An apparatus for locking the frequency of an oscillator to an atomic absorption line of a gas comprising the combination of an oscillator having a specific gain bandwidth, an input means for activating said oscillator, a compound optical resonator made up of a first reflecting means located adjacent one end of said oscillator and at least two other reflecting means located adjacent the other end of said oscillator, and a gas having an absorption line within the gain bandwidth of said oscillator confined between said two other reflecting means whereby the presence of said gas is sufficient to destroy the interference effects of said resonator allowing said oscillator to oscillate at a frequency which is locked to the frequency of the absorption line of said gas.

2. An apparatus as defined in claim 1 wherein said first reflecting means is a grating.

3. An apparatus as defined in claim 2 wherein said oscillator is a laser.

4. An apparatus as defined in claim 3 wherein said two other reflecting means are held a predetermined distance apart by an adjustable clamp.

5. An apparatus as defined in claim 4 wherein a bellows arrangement is located adjacent said two other reflecting means for confining said gas therebetween.

6. An apparatus as defined in claim 5 wherein each of said two other reflecting means are mirrors.

* * * * *